UNITED STATES PATENT OFFICE.

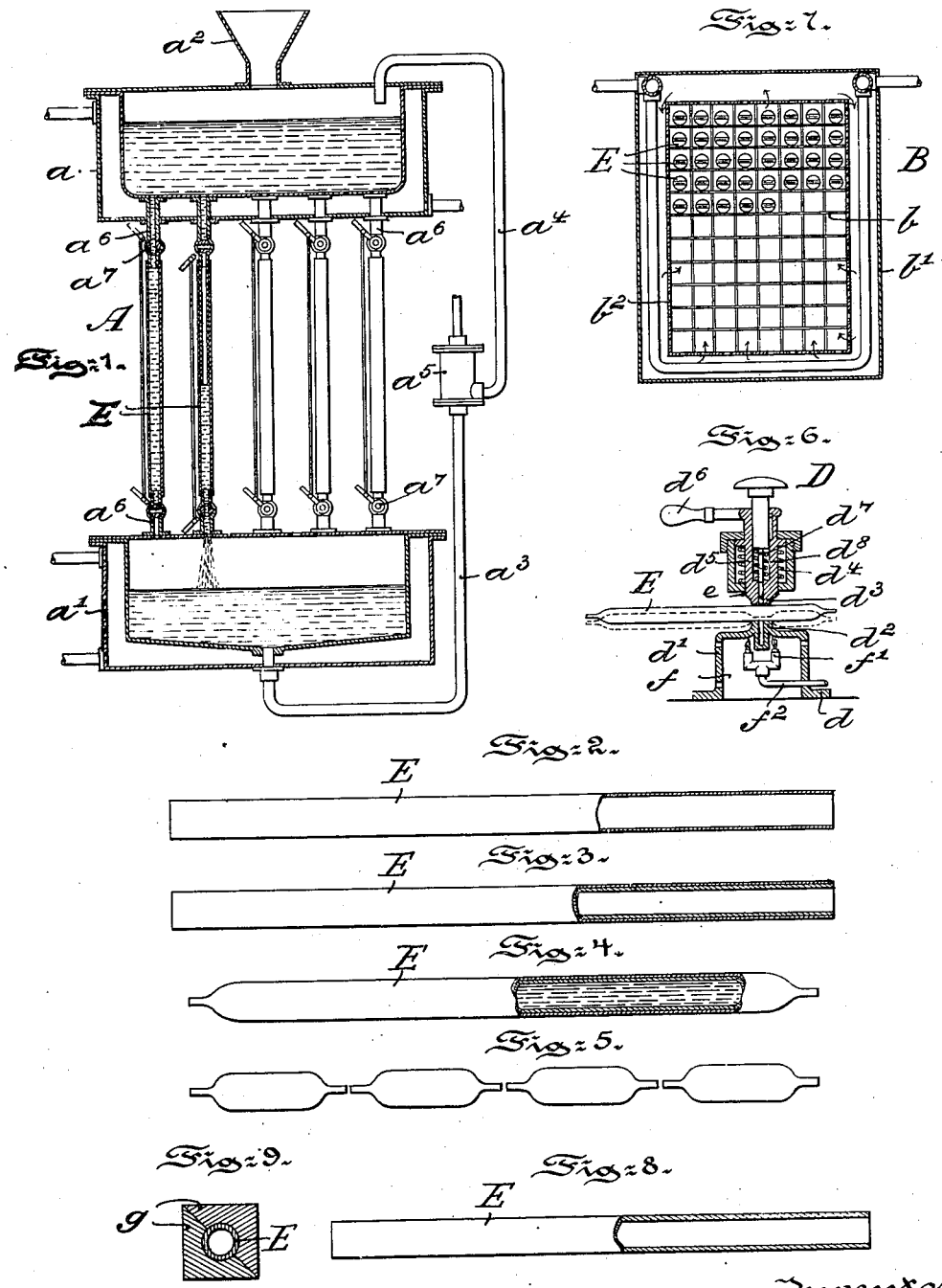

GEORGE H. PAINE, OF GERMANTOWN, PENNSYLVANIA, ASSIGNOR TO BENJAMIN T. BABBITT HYDE, OF NEW YORK, N. Y.

CAPSULE.

SPECIFICATION forming part of Letters Patent No. 700,805, dated May 27, 1902.

Application filed August 22, 1900. Serial No. 27,654. (No model.)

*To all whom it may concern:*

Be it known that I, GEORGE H. PAINE, a citizen of the United States, residing at the corner of Morris street and West School Lane, Germantown, in the county of Philadelphia and State of Pennsylvania, have invented certain new and useful Improvements in Capsules, of which the following is a specification.

My invention has relation to the manufacture of tubes or structures to become sealed capsules adapted to contain liquid and volatile substances or preparations.

The principal object of my invention is to provide tubes or similar structures made of a tough or stout paper, fabric, or flexible material coated or saturated with a gelatinous or other suitable substance and adapted to become sealed capsules for containing liquid and volatile preparations and so constructed and arranged as to retain their shape for shipment and while being handled for use or of being transferred from a single tube or similar structure into a series of single sealed capsules for the said purposes among others.

My invention, stated in general terms, consists of the manufacture of capsules, substantially as hereinafter described and claimed.

The nature and scope of my invention will be more fully understood from the following description, taken in connection with the accompanying drawings, forming part hereof, in which—

Figure 1 is a view, partly in vertical longitudinal section and partly in elevation, of a machine for coating formed tubes of paper, fabric, or other material with a gelatinous substance or other materials, showing a jacketed tank for containing a gelatinous substance in a molten state adapted to be heated by steam, heated air, or in any other preferred manner and the elevated tank having extending therefrom a series of nozzles with stopcocks to permit of a regulated flow through the tubes of the gelatinous substance, so as to adhere to the internal walls of the tubing, and with nozzles below for any surplus of gelatinous or other substances flowing therethrough to pass into a jacketed vat or tank, and which tank by pipes and a pump is connected with the upper tank for returning the gelatinous substance of the lower tank into the upper tank for subsequent use as a coating for the tubing of paper or other material to become capsules. Figs. 2 and 3 are elevational views, partly in broken section, the former of a tube of paper or similar tough material and the latter of a tube of paper or similar tough material provided on the inside with a gelatinous coating given to the same by arranging the tubes in the apparatus in the manner illustrated in Fig. 1. Fig. 4 is an elevational view, partly in broken section, of one of the tubes internally coated and filled and the respective ends sealed with a liquid volatile substance or preparation. Fig. 5 is a view of the said tube formed into separate capsules. Fig. 6 is a front elevational view, partly in section, of an apparatus for forming capsules of the said tubing similar to those illustrated in Fig. 5 and also for separating at the recessed sealed portions of the said tubing the same into individual or separate sealed capsules. Fig. 7 is a top or plan view of an apparatus for hardening and fixing the coating of the said tubing by the passage of a cooling fluid around and about and through the checker-work of the apparatus. Fig. 8 is an elevational view, partly in broken section, of a tube composed entirely of a gelatinous substance adapted to be formed in the apparatus of Fig. 1; and Fig. 9 is a cross-sectional view of a mold adapted to be placed in connection with the nozzles of the apparatus of Fig. 1 for forming the tubing entirely of a gelatinous or other similar substance or materials to subsequently become capsules, for example, of the character illustrated in Fig. 6.

Referring to the drawings, A represents a filling-machine comprising upper and lower jacketed tanks $a$ and $a'$, with a hopper $a^2$ connected with the upper tank. These tanks are provided with inlet and outlet pipes for the introduction of steam, heated air, or hot water for melting the fluid contained in the inner chamber of each of said tanks or for cooling the liquid, as occasion may require, in either of them. These tanks are connected with each other by piping $a^3$ and $a^4$, provided with a pump $a^5$, whereby the gelatinous fluid substance dripping into the lower tank from the interior of the series of detachably-supported tubes in the machine may be forced back into the upper tank for use over again. Projecting upward from the lower tank and downward from the upper tank are a series of nipples $a^6$, each provided with stop-cocks $a^7$.

E is a series of tubes made of stout or tough paper—such as parchment, silk fabric, linen, or other suitable material—of such character as to permit of the formation of the same into tubes, so as to allow a gelatinous or similar substance to pass through and become coated on the internal surface of the said tubing and of the material body of the tubing being more or less saturated with said coating, so as to render the tubing air and moisture tight and proof.

B is a hardening, cooling, and drying apparatus provided with a checker-work floor $b$ and with a jacket interposed between the inner perforated wall $b^2$ and the outer casing $b'$. This checker-work floor $b$ is provided with openings in shape or configuration similar to the tubing or similar structures formed of paper or other material, internally coated with a gelatinous substance and detachably mounted therein, as illustrated in Fig. 2, and the said jacketed apparatus is provided with tubing extending around the same between the outer casing $b'$ and the inner perforated wall $b^2$ for permitting of a free circulation of air or of a cooling agent in and about the suspended tubes therein.

D is a device for recessing and severing the filled tubing E to form the same into a series of single capsules properly sealed. This device is provided with standards $d$, carrying a platform or table $d'$, with a lower die $d^2$ and an upper die $d^3$, held normally away from each other by a coiled spring $d^4$ in a plunger-head $d^5$, operated by a hand-lever $d^6$ or other instrumentality. The upper die $d^3$ is recessed to correspond with the shape or configuration at $e$ given to the tubing E in Fig. 6. The plunger-head $d^5$ of the said device, carrying the upper die $d^3$, provided with a spring-controlled head, carries also a knife or chisel $d^7$, held normally in inoperative position by means of a coiled spring $d^8$, yet in such correlation to each other as that after recessing the tubing in substantially the manner illustrated in Fig. 5 without removing the tubes from the machine in the recessed portion of the tubing in succession each can be severed by the actuation of the knife or chisel $d^7$ and formed into single capsules, with their contained substance or materials in liquid and volatile form therein hermetically sealed against extraneous or atmospheric conditions. Between the standards and beneath the same in a perforated chamber $f$ are provided a series of gas or oil jets $f'$, having a pipe $f^2$, connected with a suitable source of gas or oil supply, whereby in the recessed portion of the same through the influence of heat from the jets $f'$ the tubing is sealed, so that quickly and economically a tubing of paper internally coated with gelatin or other suitable substance or materials or even a tubing composed entirely of a gelatinous or similar substance may be formed into individual capsules without loss of material contained in the capsules, the entrance of air or gas thereinto, or escape of the volatile constituents of the contained liquid or other matter therefrom. This is important, due to the fact that substances or materials placed in capsules are usually of such a nature as to be readily affected by atmospheric conditions or even to be so volatile as to dissolve or become so tainted as to be useless under such conditions, mainly because of the hydroscopic nature of such substances or materials.

The tube formation shown in Fig. 8 is provided by mounting the two-part mold $g$ in connection with the two series of nipples of the apparatus of Fig. 1 and permitting the free passage of the gelatinous substance or fluid from the elevated tank $a$ to pass through the molds in such manner as to cause the formation of a gelatinous tubing, which upon cooling and hardening in the apparatus of Fig. 7 may be brought into the form of capsules of the character illustrated in Fig. 5 by the passing of the same, after having been filled and sealed at the respective ends in any suitable manner, through the apparatus of Fig. 6 and first recessing the tubing and by the operation sealing the same in the recessed portion and then severing the recessed portion about midway therein by the knife or chisel $d^7$ of the apparatus D without interfering in any manner with the hermetically-sealed condition of the gelatinous-filled tubing E. This tubing when it becomes hard or rigid assumes a tough condition, and hence while readily friable or capable of being dissolved is impermeable to outside atmospheric conditions. In the formation of a tubing of gelatinous substances it is preferred to use a mold oblong and rectangular in form, in which the two parts are doweled or keyed to each other, and after the formation of the tubing E in such molds the two parts of the mold $g$ can be readily separated from the formed tubing E therein by the removal of the series of the said molds $g$ from the nozzles $a^6$ of the apparatus A of Fig. 1 of the drawings.

The particular advantages of making a tubing out of paper or similar tough and stout material is to hold not only the internal coating of gelatinous or other similar substance more firmly to seal the materials which it embraces as well as to make the packet waterproof, but also to afford means for printing or stamping upon the exterior surface of the capsules directions for using the intenal contents of the capsules and to receive thereon advertising matter in respect to the internal contents of the tubing when it has assumed the form of capsules or of a series of linked-together capsules adapted to be separated from each other without affecting each other or destroying the usefulness of the capsulelike structure or the unsevered series of such structures to be used as capsules. The heating of the dies during the recessing of the tubing insures a strong seal being formed between capsules formed of the character illustrated in Fig. 5 and prior to their separation from each other, as shown therein.

Having explained the manner of making capsules of my invention, one preferred form of apparatus, as illustrated, for carrying into effect the same may be briefly described, as follows: The apparatus of Fig. 1 being provided with a series of tubing in connection with the nipples connecting the upper tank with the lower tank through the tubing mounted in connection with said nipples under the due regulation of stop-cocks, the gelatinous substance or material is permitted to pass slowly or rapidly, as may be desired, through the tubing and in passage through the tubing to so coat the same as to produce a film-like surface around and about the internal wall of the tubing, and any surplus passing through the tubing being liberated into the lower tank, from whence it may be lifted by the pump $a^5$ and piping $a^3$ and $a^4$ into the elevated tank for use over again. The tubing having been internally coated in the manner explained is then removed and arranged in the checker-work of the cooling and hardening apparatus of Fig. 2 to reduce the temperature of the same therein, and thereby to harden the internal coating of the suspended tubes in the apparatus D. The circulation of a cooling agent or cold air through this apparatus D is adapted to expedite hardening of the internal coating of the tubes E and when sufficiently hard to be removed. To retain their shape, they are passed through the recessing or severing apparatus of Fig. 6, so as to form the tubing into capsules of the character illustrated in Fig. 5, after first having been filled with a liquid or other suitable substance of a volatile or hydroscopic character, and when the tubing has assumed the condition illustrated in Fig. 5, hermetically sealed and severed into a series of single capsules, they may be packed in boxes or other suitable receptacles for shipment and subsequent use.

Having thus described the nature and object of my invention, what I claim as new, and desire to secure by Letters Patent, is—

1. A capsule, comprising an outer tube of compressible relatively tough material, an inner tube of gelatinous material, the inner tube adapted to contain a filler material and both tubes being flattened at their ends to inclose the filler material.

2. A capsule, comprising an outer tube of compressible relatively tough material, an inner tube of gelatinous material, the inner tube adapted to contain a filler material and both tubes being flattened at their ends to inclose the filler material, and the said tubes intermediate of their ends being flattened to form intermediate closures.

3. A capsule, comprising an outer tube of compressible but tough material, an inner tube of gelatinous material, the inner tube adapted to contain a filler material, the ends of the tubes being flattened to form closures and both tubes being flattened intermediate of their ends to form intermediate closures and points.

In testimony whereof I have hereunto set my signature in the presence of two subscribing witnesses.

GEORGE H. PAINE.

Witnesses:
J. WALTER DOUGLASS,
THOMAS M. SMITH.